United States Patent [19]

Fischer et al.

[11] Patent Number: 4,521,370
[45] Date of Patent: Jun. 4, 1985

[54] CONTROL OF NUCLEAR REACTORS

[75] Inventors: Larry E. Fischer, Los Gatos; Jackie E. Bean, Santa Clara, both of Calif.

[73] Assignee: General Electric Company, San Jose, Calif.

[21] Appl. No.: 396,394

[22] Filed: Jul. 8, 1982

[51] Int. Cl.³ ............................................. G21C 19/20
[52] U.S. Cl. .................................................. 376/233
[58] Field of Search ............................... 376/233, 260

[56] References Cited

U.S. PATENT DOCUMENTS

| 3,020,887 | 2/1962 | Hobson et al. | 376/235 |
|---|---|---|---|
| 3,020,888 | 2/1962 | Braun | 376/236 |
| 4,158,600 | 6/1979 | Akimoto et al. | 376/233 |
| 4,292,131 | 9/1981 | Suzuki | 376/233 |
| 4,292,133 | 9/1981 | Sasaki et al. | 376/260 |

FOREIGN PATENT DOCUMENTS

| 2442722 | 3/1976 | Fed. Rep. of Germany . |
|---|---|---|
| 2547918 | 5/1976 | Fed. Rep. of Germany . |
| 2409181 | 8/1976 | Fed. Rep. of Germany . |
| 1813293 | 12/1976 | Fed. Rep. of Germany . |
| 1911057 | 2/1977 | Fed. Rep. of Germany . |
| 2505692 | 4/1977 | Fed. Rep. of Germany . |
| 2547919 | 5/1979 | Fed. Rep. of Germany . |
| 2822793 | 12/1979 | Fed. Rep. of Germany . |
| 51-13834 | 5/1976 | Japan . |
| 51-26597 | 8/1976 | Japan . |
| 52-2479 | 1/1977 | Japan . |

Primary Examiner—Sal Cangialosi
Attorney, Agent, or Firm—Ivor J. James, Jr.; Samuel E. Turner; Raymond G. Simkins

[57] ABSTRACT

In a coupling system for a nuclear reactor control rod and control rod drive, said coupling system being selectively uncouplable by an uncoupling rod, a system of passages for exercising a countervailing force on the uncoupling rod to prevent inadvertent uncoupling during scram.

1 Claim, 5 Drawing Figures

CONTROL OF NUCLEAR REACTORS

BACKGROUND AND SUMMARY

Control rod drives are employed in nuclear reactors to position control rods with respect to the core of the reactor. Depending upon whether sufficient numbers of control rods are inserted into the core at appropriate locations and whether these rods are completely or partially inserted, the reactor is either completely shut down or its operation is modified to continue at a different level or according to a different power distribution within the core. Fast or emergency insertion of the control rods is referred to by those skilled in the art of nuclear reactors as "scram." Normal insertion or withdrawal of the control rods in the reactor, on the other hand, is called "shimming."

Control rod drives for electromechanically establishing the level of control rods in a reactor for normal operation, optimal power shaping, and economical fuel management have been known for years. One such drive is the subject of a patent application in West Germany by Kraftwerk Union AG. Offenlegungschrift Pat. No. 2442722 contains the application which was laid open to the public on Mar. 25, 1976.

This drive is not sectionable into parts for removal, however, making it necessary for the entire drive to be removed in one piece from the reactor pressure vessel for maintenance, repair, or disassembly. Furthermore, this drive does not employ a differential pressure technique as disclosed herein to prevent inadvertent uncoupling of the control rod drive and the control rod itself during reactor operation or scram. These features, among others, serve to distinguish the instant invention from the apparent prior art.

The invention herein is applicable to boiling water reactors, in which the core is covered with water for cooling, and which are designed to insert control rods from below the pressure vessel containing the core of the reactor. The claims cover concepts and features, however, which can be employed in other kinds of reactors and in linear-motion producing devices not within the field of reactor technology.

For more details with regard to the kinds of nuclear reactors, see pages 5-1 to 5-129 in *Energy Technology Handbook* (1977) by McGraw-Hill, [Douglas M. Considine, P.E., editor-in-chief]. Additionally, *Nuclear Reactor Engineering* by Samuel Glasstone and Alexander Sesonske, published in 1981 by Van Nostrand Reinhold Company, and *Introduction to Nuclear Engineering* by John R. Lamarsh, published in 1977 by Addison-Wesley Publishing Company, are useful references.

The reactor pressure vessel in a boiling water reactor is supported by a massive foundational structure or pedestal, perhaps constructed of concrete. The structure defines an opening or "hatch" which permits the essentially horizontal transportation of the control rod drive between the underside of the pressure vessel and other compartments of the reactor facility.

The underside of the pressure vessel defines a pit of predetermined dimensions and is bounded by the walls of the pedestal supporting the pressure vessel. Numerous control rod drives (their precise number depends upon the size of the reactor core and the number of control rods needed to control criticality of the reactor) extend below the pressure vessel into the pit.

Each control rod drive is suitably coupled to a control rod for contributing to control of the reactor. The core is suitably high in the pressure vessel to permit the control rods to remain within the pressure vessel when fully withdrawn from the core. This requirement makes it necessary for a portion of the control rod drive to traverse the distance between the bottom of the pressure vessel to the vicinity of the core, in order to fully insert a control rod within the core. When this portion of the control rod drive is fully withdrawn from the pressure vessel, it is contained within a pressure tube of the control rod, which is typically about 16 feet long.

In fully hydraulically operated control rod drives, the motive power for scram or partial insertion of control rods into the core is applied through a relatively short package of equipment mounted under the pressure vessel. Electromechanical control rod drives are much longer, because they utilize an electric motor at the lower end of the control rod drive to turn a shaft and spindle to insert the control rod into the reactor core for shimming and which utilize hydraulic drive for scram. In addition, seals and various coupling devices increase the overall length of the control rod drive.

Installation and removal of such a control rod drive is accomplished by translating the aspect of the control rod drive between vertical and horizontal postures. Passage through the hatch in the pedestal is horizontal; however, the control rod drive is vertical when installed. Within the limited space available in the pedestal under the pressure vessel, the control rod drive is turned from one aspect to another. Clearly, with a longer control rod drive this is made more difficult and possibly impossible.

Even when installation and removal of the control rod drive is accomplished within the bounds and dimensions of the pedestal, preventing the uncoupling of the control rod drive from the control rod itself during reactor operation or scram remains a significant challenge.

The electromechanical control rod drive of interest herein "scrams" by applying high pressure directly under the head of a hollow drive piston which carries the control rod. In contrast to some kinds of fully hydraulic control rod drives such as are disclosed in U.S. Pat. Nos. 3,020,887 and 3,020,888 (hereby expressly referred to and incorporated herein), in which the insertion pressure is applied primarily at the foot of the piston (or index tube), the pressure here is applied directly under the head of the piston in the structure discussed with reference to an embodiment of the invention herein.

The uncoupling rod for detaching the control rod drive from the rod itself is designed to traverse the head of the drive piston. In the case of fully hydraulic drives, leakage through the aperture receiving the uncoupling rod is of no great detriment.

However, in the case of the electromechanical control rod drive, excessive leakage through the piston head would prevent the establishment of a scram-suitable pressure. To control leakage, circumferential ridges and depressions are accordingly formed along the sides of the uncoupling rod. The rod itself is enclosed within the head of the aforementioned drive piston by a second smaller piston which is similarly formed with circumferential ridges and depressions, which inter alia help prevent adverse effects due to impurities, particles, and the like which may be found in the water.

To disassemble the control rod, the uncoupling rod is axially translated in an upward direction. Within the tight tolerance required to prevent leakage, water displaced by the movement of the second piston enters or leaves the chamber region by passages provided in the head of the drive piston.

Another challenge is encountered regarding high pressure scram. The pressure under the head of the first piston tends to drive the uncoupling rod upward, causing the control rod and the control rod drive to uncouple. Furthermore, at the end of a stroke, portions of the control rod drive including the piston decelerate so rapidly that the inertia of the uncoupling rod causes the rod to destabilize and potentially separate the control rod from the control rod drive.

OBJECTS OF THE INVENTION

It is an object of the instant disclosure to describe a control rod drive that is conveniently installable, maneuverable under and removable from the underside of a nuclear reactor pressure vessel.

It is an object to reduce the size of pressure vessel foundations in nuclear reactors by providing a control rod drive in plural sections which are conveniently installable, maneuverable under, and removable from the underside of a nuclear pressure vessel.

It is an object to provide a method for conveniently installing and removing an electromechanical control rod drive vis-a-vis the underside of a nuclear reactor pressure vessel.

It is an object to prevent the accidental uncoupling of control rod drives from control rods during reactor operation or scram.

A further object of the instant disclosure is to describe a decouplable control apparatus for a nuclear reactor, which is constructed in removable sections and defines sealing surfaces for preventing the spillage of water.

PREFERRED EMBODIMENT OF THE INVENTION

Figure 1:
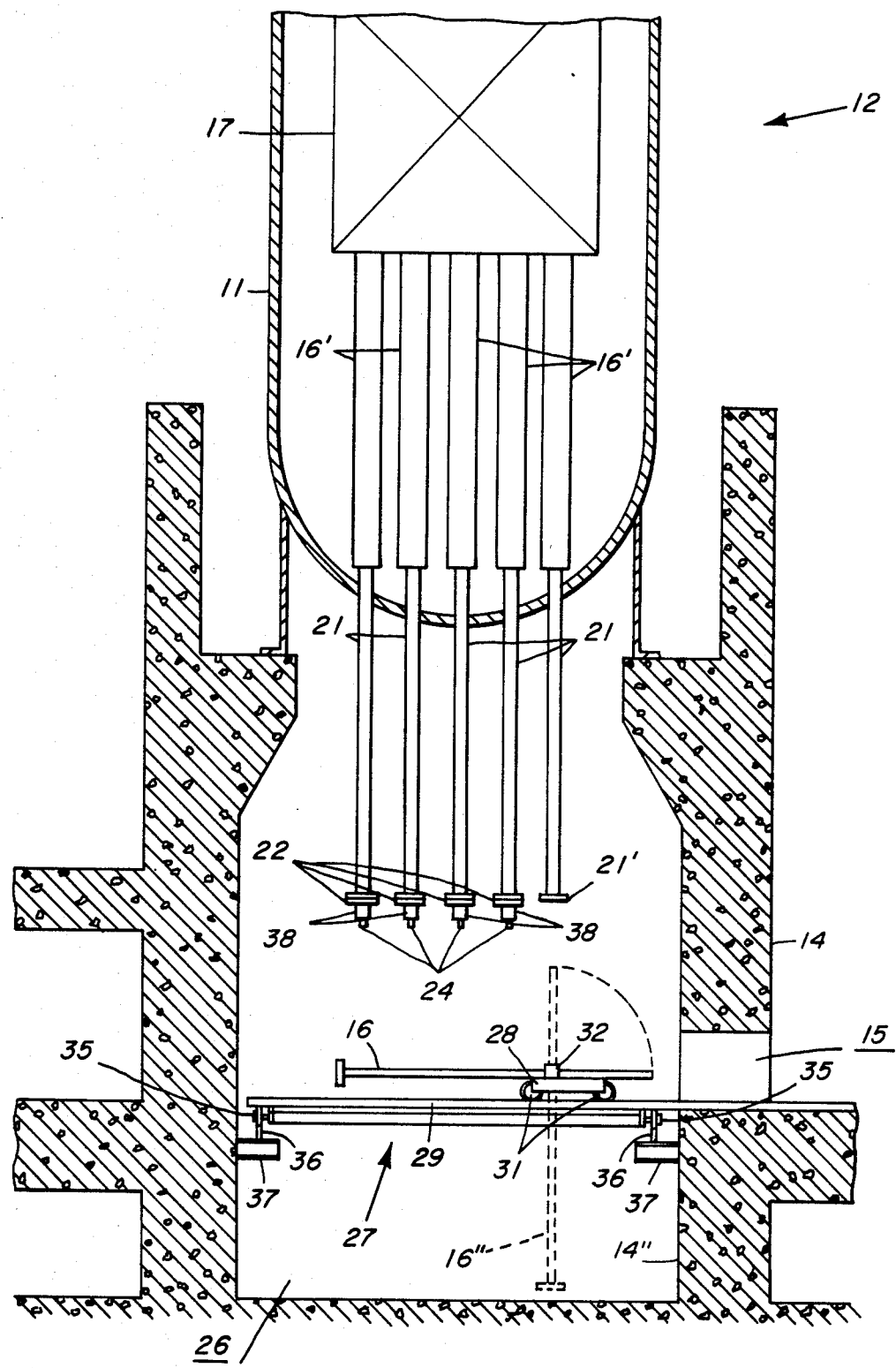
FIG. 1 is a vertical cross section of a nuclear reactor pressure vessel supported by a foundational structure.

FIG. 1 shows a pressure vessel 11 of a nuclear reactor 12 mounted on a pedestal or foundation 14. The pedestal has an opening or hatch 15 to permit the passage of a control rod drive 16 through pedestal during installation or removal thereof.

The pressure vessel 11 supports a nuclear core 17 containing a nuclear mass capable of attaining criticality. Above-referenced U.S. Pat. Nos. 3,020,887 and 3,020,888 provide examples of such a pressure vessel. Control rod drives 16 are effective for inserting control rods 16' into the core 17 for shutting down the reactor 12 or for controlling the steam production, fuel burnup, or pressure level thereof.

FIG. 1 shows an outer tube 21 of the control rod drive 16 mounted on the pressure vessel 11. A housing structure 22 and a motor 24 are mounted at the lower end thereof, and the motor 24 provides fine motion control over the axial position of the control rod 16'.

The pedestal 14 in FIG. 1 defines a pit 26 of limited dimensions. For removal and insertion of a control rod drive 16, a support structure 27 is provided to enable a cart 28 to enter the pit 26. The support structure 27 may for example be disc-like with a wide gap (not shown) along its diameter. The structure 27 includes a pair of rails 29, straddling the wide gap and supporting wheels 31 of the cart 28. The cart 28 itself has a longitudinal gap (not shown) between its sides, which permits a control rod drive 16 to be inserted or removed therebetween as shown at dotted lines 16" for removal or installation.

When the control rod drive 16 is inserted or removed, it must clear the bottom of the pit 26 and the pedestal sides 14". After the control rod drive 16 has been installed into the outer tube 21, the housing structure 22 and motor 24 can be installed.

The cart 28 includes a pivotally supported body 32 which can be vertically disposed in order to align with the position of a control rod drive 16 mounted in the pressure vessel 11. So disposed, the control rod drive 16 indicated by dotted lines 16" extends below the rails 29 and through the wide gap therein mentioned above.

The structure 27 turns on wheels 35 supported on a circular track 36 mounted on suitable extensions 37 from the walls of the pedestal 14. This permits the structure 27 to suitably position a control rod drive 16 under any desired one of the control rod positions on the underside of the pressure vessel 11.

Figure 2:
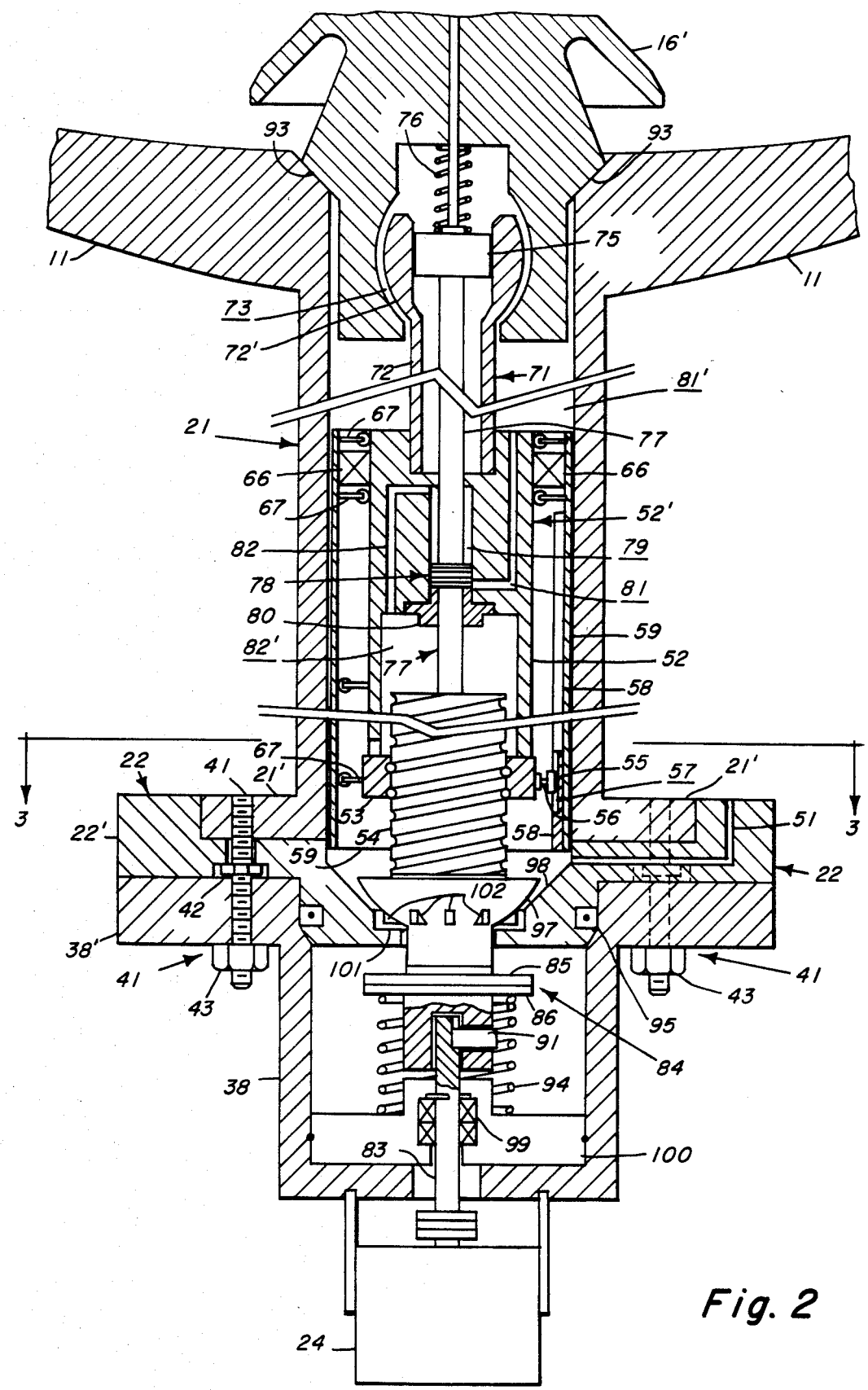
FIG. 2 is a vertical cross section of a control rod drive disposed on the underside of the pressure vessel.
Figure 3:
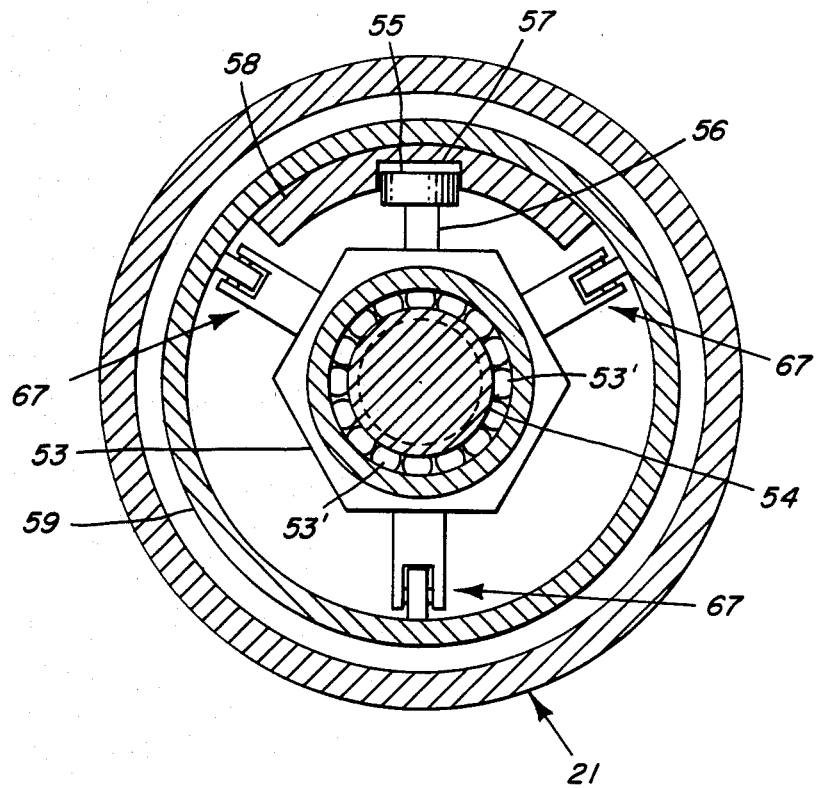
FIG. 3 is a horizontal cross section of the control rod drive depicting a ball-screw-and-nut assembly and an anti-rotation roller for preventing the nut from rotating within the control rod drive.

In FIG. 2, the outer tube 21, the housing structure or housing 22, and a motor support structure 38 are shown held together by threaded studs 41 including a widened portion 42 and nuts 43. These are conveniently actuable from below. The outer tube 21, the housing 22, and the motor support structure 38 include respective flanges 21', 22', and 38' for receiving the studs 41. A passage 51 is defined in the housing structure 22 for applying a scram or high pressure on the underside of a drive piston 52 supporting the control rod 16'. The drive piston 52 accordingly separates regions of relatively high and low pressure. The high and low pressure is suitably distributed in accordance with seals shown in FIG. 2. The housing 22 holds the drive piston 52 in position under the pressure vessel 11. The piston 52 is for example supported by a ball nut 53 depicted in greater detail in FIG. 3 which shows the recirculating ball bearings 53' of the ball nut 53. The ball nut 53 is axially driven by a threaded screw or spindle 54. The ball nut 53 is prevented from rotating with the spindle 54 by an anti-rotational bearing 55 connected to the ball nut 53 by a suitable extension 56. The bearing 55 rides in a vertical slot 57 formed in a rack 58 mounted on a guide tube 59 of the control rod drive 16 whereby rotation of nut 53 is prevented. The drive piston 52 reposes on the ball nut 53 but it is not attached thereto. Thus when the spindle 54 is rotated in the direction to move the ball nut 53 upward, the piston 52 is driven upward. When the spindle 54 is rotated in the direction to move the ball nut 53 downward, the piston 52 follows the ball nut 43 downward by force of gravity. The guide tube 59 serves as a thermal shield to protect the control rod drive from temperature fluctuations and to guide the axial motion of the drive piston 52. Additionally, the guide tube 59 permits convenient insertion and removal as a package annular or circumferential. This minimizes the leakage of water through head 52' and circumventing uncoupling rod 77 and piston 78. The grooves and ridges additionally protect the sliding surfaces of rod 77 and cylinder 78 from galling.

Figure 4A:
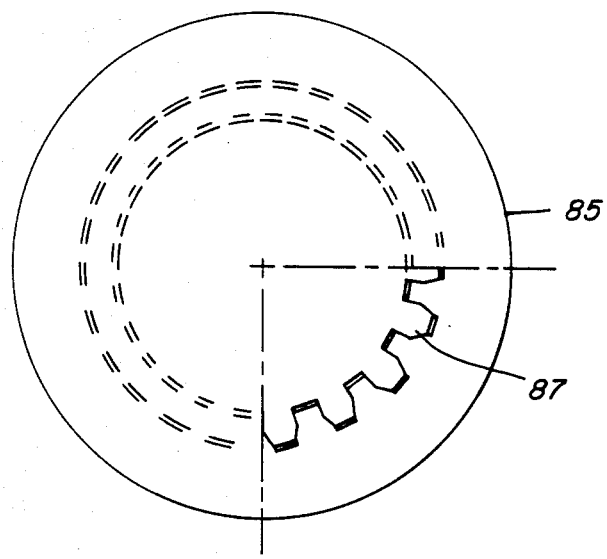
FIGS. 4A and 4B illustrate in respective horizontal and vertical cross-sections a spline connection between the shaft of the control rod drive motor and the ball screw.
Figure 4B:
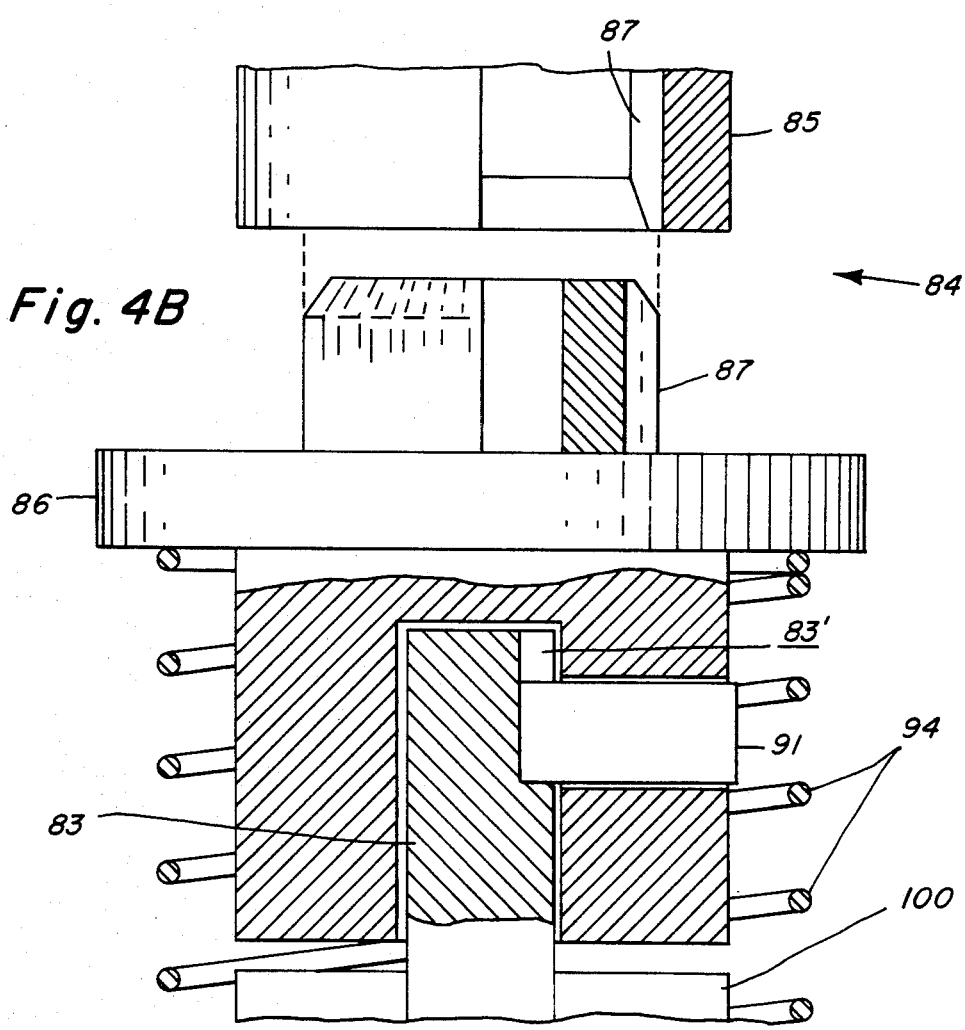

The motor 24 shown in FIG. 2 controls the rotation of the spindle 54 by turning a shaft 83 which connects to the spindle 54 through a spline connection 84 shown in greater detail in FIGS. 4A and 4B. The spline connection 84 includes an upper portion 85, formed on the lower end of spindle 54, which is cooperatively recieved by a lower portion 86. Each portion 85 and 86 defines teeth 87 for meshing with each other.

The upper portion 85 of the spline connection 84 is fixed onto spindle 54; the lower portion 86 of the spline connection 84 is axially slideable on shaft 83. Rotation of portion 86 with shaft 83 is accomplished by sliding key 91 mounted through the spline connection 84 and inserted into a longitudinal slot or keyway 83' for example machined into the shaft 83 itself. The sliding key 91 permits axial movement between the motor shaft 83 and the lower portion 86 of spline connection 54 sufficient to accommodate axial movement of lower portion 86 from between the compressed and decompressed positions of biasing member or spring 94. A biasing member, shown as a spring 94 bears against a radially extending flange at the upper end of lower portion 86 of the spline connection 84. (Suitable bearing means, such as a roller bearing—not shown, are provided between the upper end of spring 94 and the flange of lower portion 86 to facilitate rotation of the lower portion 86 with respect to spring 94.) Thus spring 94 urges upward and supports lower portion 86 which in turn normally supports the weight of spindle 54, drive piston 52 and the control rod 16' coupled to the latter.

Before removing the motor support structure 38 from the control rod drive 16 during disassembly, the drive piston 52 is uncoupled from the control rod 16'. This is accomplished by withdrawing the control rod 16' from the core 17 by turning the spindle 54 until the control rod 16' is back-seated against a sealing surface 93 at the bottom of the pressure vessel. This back-seated condition is shown at the top of FIG. 2.

Continuing to turn the spindle 54 after the control rod 16' is back-seated, causes an upward movement of the spindle 54 as the upwardly-biasing member or spring 94 decompresses against the lower portion 86 of the spline 84. The upper portion of the spindle 54 then meets the uncoupling rod 77 and moves it vertically and displaces water in the upper portion of chamber 79, ejecting it through passage 82. This introduces other water into the lower portion of chamber 79 through passage 81. This does not lead to overcompression in region 82', because the ball nut 53 does not serve as a barrier to the passage of water. The uncoupling rod 77 upwardly displaces the plug 75, permitting the fingers of the spud 71 to move inwardly, releasing the drive piston 52 and allowing it to translate downwards.

By removing nuts 43, withdrawal is permitted of the motor support structure 38 and the motor 24 from the underside of the control rod drive 16. As withdrawal occurs, seals 95 are effective to prevent spillage of water until preferably spherically-shaped surface 97 of the spindle 54 and the preferably conical mating inner surface 98 of housing structure 22 meet to prevent leakage therethrough. Surfaces 97 and 98 may have other shapes to effect sealing operation. Other seals 99 in a suitable housing 100, which supports the biasing member or spring 94, effectively prevent leakage along the shaft 83 of motor 24. Surface 97 defines protrusions 102 effective for cooperating with recesses 101 in surface 98. This prevents rotation between surfaces 97 and 98 once they are engaged. By inhibiting spindle rotation in this manner, accidental withdrawal of the control rod 16' from core 17 is prevented.

After the motor support structure 38 has been removed, the housing structure 22 can be removed as well. This involves undoing studs 41 by working the enlarged portion 42 as for example with a wrench and suitably withdrawing the guide tube 59 and its contents from the outer tube 21, possibly with the assistance of a mechanical hoist (not shown) and the transport cart 28 as is for example shown in FIG. 1.

The foregoing description is susceptible of reasonable modifications that may occur to those skilled in the art. However, this invention is not meant to be limited to the embodiment just shown and described. The claims set forth the inventive concepts and are intended to cover all modifications coming within the spirit and scope of the invention described herein.

What is claimed is:

1. In a vertically oriented control rod drive device positioned beneath a pressure vessel for selectively inserting a control rod into a nuclear reactor core in said pressure vessel including a tubular drive housing secured to the bottom of said pressure vessel and extending downward therefrom; a lower housing secured to and closing the lower end of said drive housing; a drive piston having an upper head portion and a lower, elongated, annular skirt portion reciprocably disposed in said drive housing including sealing means for providing a fluid seal between said drive piston and said drive housing; an upwardly extending coupling member secured to the top end of said drive piston and including coupling means for releasably coupling said drive piston to said control rod; a coupling release rod coaxially positioned in said connecting member and penetrating into said drive piston and being reciprocable between an upper position and a lower position; latching means secured to said coupling release rod for latching said coupling means to said control rod when said release rod is in its lower position and for releasing said coupling means from said control rod when said release rod is in its upper position; means for admitting a drive fluid at a pressure higher than the pressure in said pressure vessel to the under side of said drive piston for rapid fluid drive insertion of said control rod into said core; a stabilizing arrangement for preventing movement of said coupling release rod toward its upper position and consequent release of said coupling means during fluid drive of said drive piston comprising: a cylindrical chamber in said drive piston surrounding said release rod; an annular chamber piston in said chamber secured to said release rod for reciprocating therewith; a first fluid passage from the under side of said drive piston to the upper end of said chamber; and a second fluid passage from the upper end of said drive piston to the lower end of said chamber whereby during fluid drive of said drive piston the net force on said chamber piston is downward to maintain said release rod in its lower position whereby said control rod remains coupled to said drive piston.

* * * * *